United States Patent
Hara et al.

(10) Patent No.: US 7,344,255 B2
(45) Date of Patent: *Mar. 18, 2008

(54) LIGHT AMOUNT ADJUSTING APPARATUS AND PROJECTOR USING THE SAME

(75) Inventors: Toyoyuki Hara, Kai (JP); Katura Nakajima, Nirasaki (JP); Tokuro Kusunoki, Enzan (JP); Yukihiko Hayakawa, Koufu (JP)

(73) Assignee: Nisca Corporation, Minamikoma-Gun, Yamanashi-ken (JP)

( * ) Notice: Subject to any disclaimer, the term of this patent is extended or adjusted under 35 U.S.C. 154(b) by 344 days.

This patent is subject to a terminal disclaimer.

(21) Appl. No.: 11/060,620

(22) Filed: Feb. 18, 2005

(65) Prior Publication Data

US 2005/0219474 A1    Oct. 6, 2005

(30) Foreign Application Priority Data

| Apr. 1, 2004 | (JP) | ............................. 2004-108719 |
| Apr. 1, 2004 | (JP) | ............................. 2004-108720 |
| Sep. 9, 2004 | (JP) | ............................. 2004-262690 |

(51) Int. Cl.
*G03B 21/14* (2006.01)

(52) U.S. Cl. .......................................... 353/88; 353/97

(58) Field of Classification Search .................. 353/88, 353/91, 92, 93, 97; 352/141, 204, 207; 355/71; 362/283, 322; 359/236

See application file for complete search history.

(56) References Cited

U.S. PATENT DOCUMENTS

| 3,771,867 | A  | * | 11/1973 | Moser ........................ 399/138 |
| 5,057,864 | A  | * | 10/1991 | Kijima et al. .................. 355/71 |
| 6,854,851 | B2 | * | 2/2005  | Yamasaki et al. ............. 353/97 |
| 7,055,966 | B2 | * | 6/2006  | Momose et al. ............. 353/97 |
| 7,182,470 | B2 | * | 2/2007  | Hashimoto et al. ........... 353/97 |
| 7,185,990 | B2 | * | 3/2007  | Koga et al. ................... 353/97 |

FOREIGN PATENT DOCUMENTS

| JP | 2000-28988  | 1/2000 |
| JP | 2003-121938 | 4/2003 |

* cited by examiner

*Primary Examiner*—Rodney Fuller
(74) *Attorney, Agent, or Firm*—Manabu Kanesaka

(57) ABSTRACT

At least a pair of light amount adjusting plates is allocated at peripheral side rim portions of a light path through which light from a light source is projected. These light amount adjusting plates are drivable between a narrow-down position in which they enter into the light path and a retreat position in which they retreat to outside of the light path. A restriction member such as a stopper member restricts a rotation of the light amount adjusting plate at the retreat position, and a holding unit holds the light amount adjusting plate to this restriction member. The restriction member blocks a predetermined angle or further rotation of the light amount adjusting plate, and the holding unit, such as a spring or a magnet, biases the light amount adjusting plate to the restriction member.

13 Claims, 12 Drawing Sheets

Fig. 7(a)
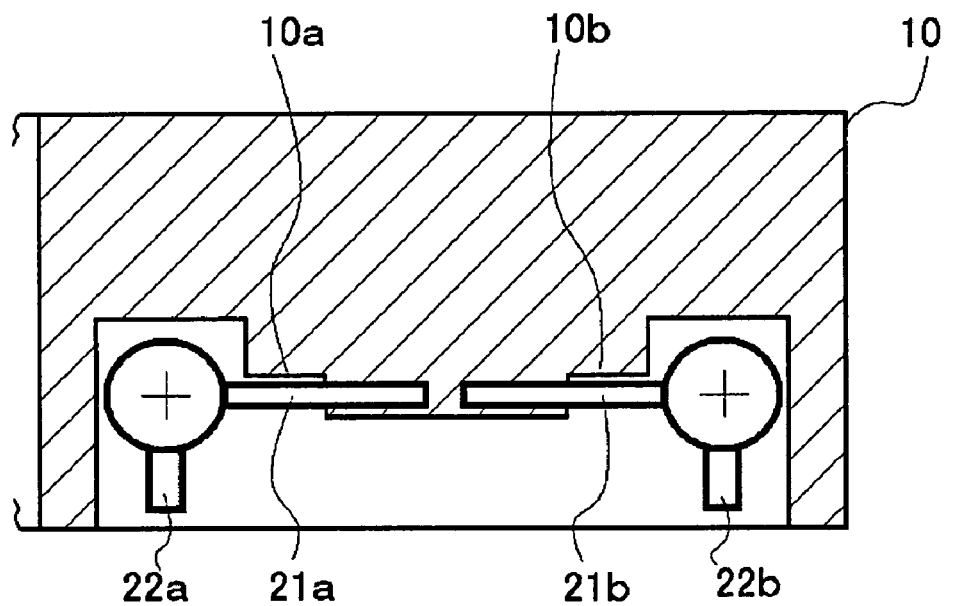
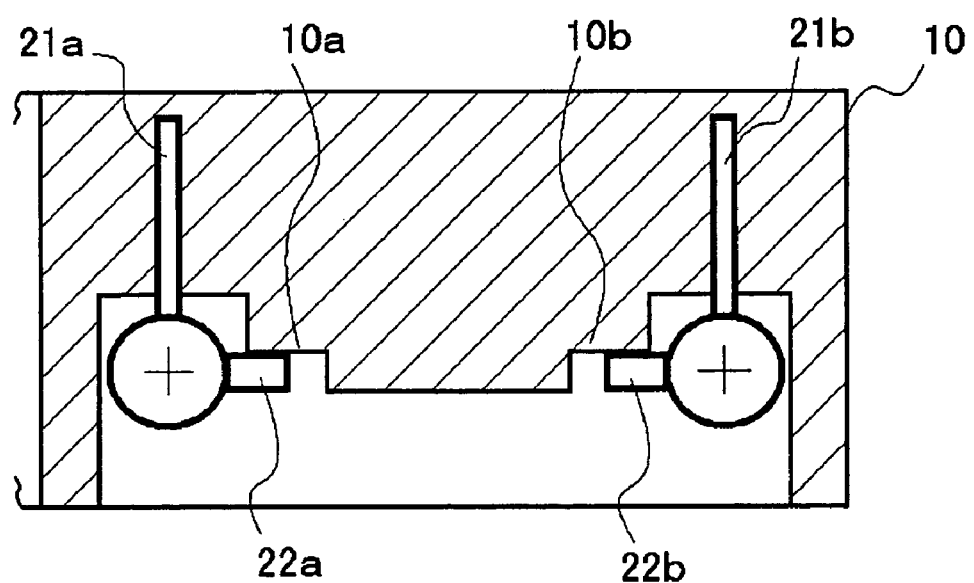
Fig. 7(b)

ex  Lo=10mm, Φ=5

⊿1≒0.04mm

⊿2≒0.87mm

Fig. 12(a)
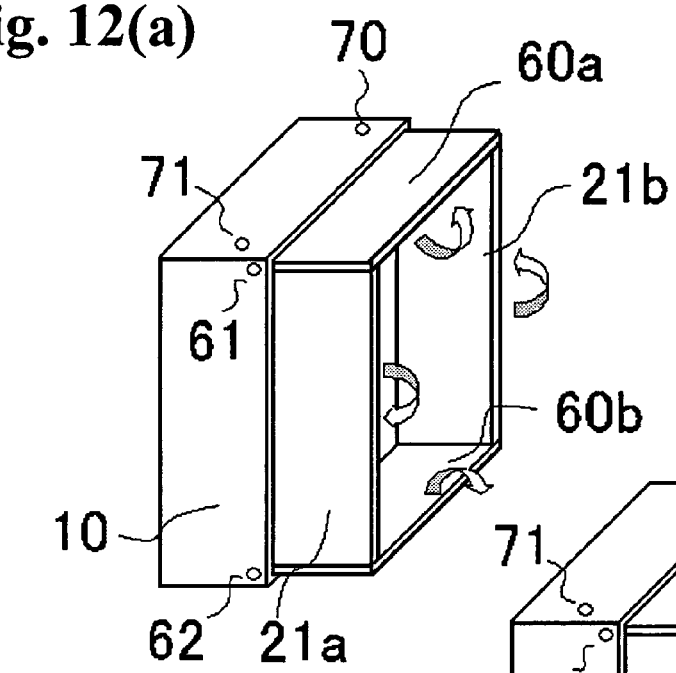
Fig. 12(b)
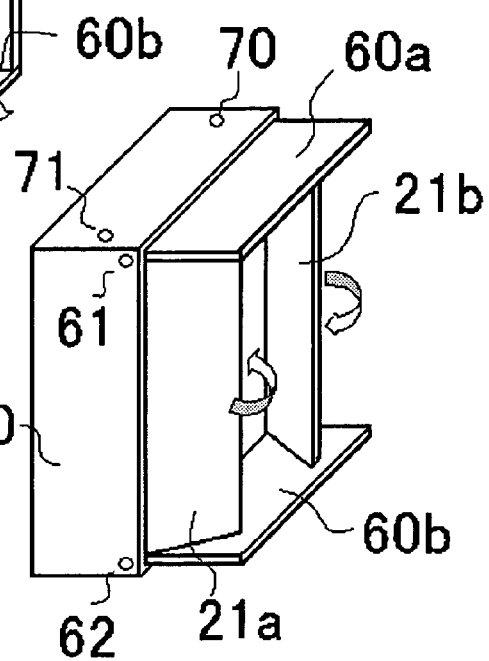
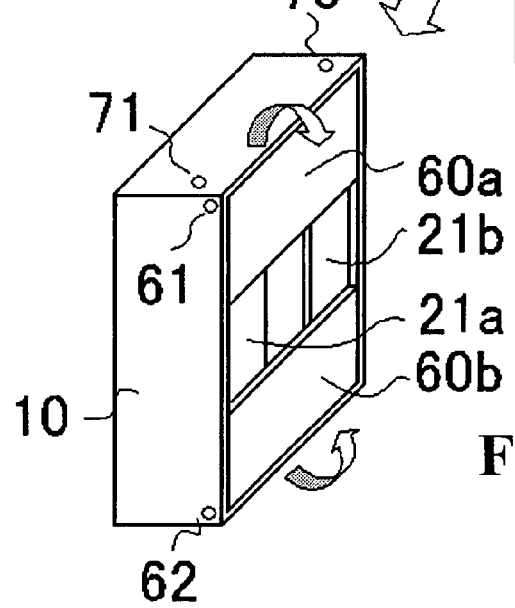
Fig. 12(c)

LIGHT AMOUNT ADJUSTING APPARATUS AND PROJECTOR USING THE SAME

BACKGROUND OF THE INVENTION AND RELATED ART STATEMENT

This invention relates to a light amount adjusting apparatus which adjusts a light amount on the occasion of projecting an image, which was formed by an image forming unit such as a liquid crystal panel, on a screen, by a projection lens, and a projector which used this.

In general, an apparatus such as a liquid crystal projector, which projects alight image on a screen, is widely used as an apparatus which is connected to imaging devices such as a computer and a television receiver, and projects images which were outputted from these imaging devices, on a screen by a projection lens.

There is such a case that someone feels a light image, which was projected by the suchlike projector, too bright, and dark, depending on a circumstance where it is used. Its cause is, for example, that a person feels light is too bright when an image is made suddenly bright in such a state that pupils of a human, who uses it at a dark place, are opened, and, inversely, at a bright place, a human feels an image placed on a screen is too dark, and so on, and viewability due to brightness of a surrounding becomes a problem.

Consequently, there arises a need to adjust brightness of an image which is projected on a screen, depending on a surrounding environment. In the past, as a method of adjusting the suchlike projection light amount, a method for adjusting a light source which irradiates to a liquid crystal panel etc., and a method for adjusting a voltage which is applied to a liquid crystal panel are known in for example, Patent Document 1 (JP-A-2000-28988 publication).

In the past, as a method for adjusting the suchlike projection light amount (brightness of a screen image), it is known to adjust a voltage which is applied to a liquid crystal panel. However, the liquid crystal panel has a special relation between a voltage and a transmission factor, and there were such problems that it is difficult to control a voltage in such a manner that red, blue and green change evenly on the occasion of changing brightness by changing a voltage, and in addition, a hue also changes on the occasion of adjustment of brightness.

Consequently, it is proposed, in for example, Patent Document 2 (JP-A-2003-121938 publication) etc., to constantly adjust brightness of a screen image by adjusting an amount of light which is projected by a projection lens, by use of a light shielding plate. The Patent Document 2 discloses such a thing that a base member having a projection hole (lens hole) is disposed on a front surface of a projection lens in a direction which is orthogonal to a projection light path of the lens, and a light shielding plate for adjusting a bore diameter of the projection hole larger and smaller (mask member) is attached to this base member, in a direction which is orthogonal to a light path, in such a manner that it can be opened and closed, to adjust a light amount. Therefore, an image, which was formed on a liquid crystal panel, receives light from a light source, and adjusts an image interval on the occasion that it is irradiated on a screen by the projection lens by adjusting an opening of a light path by use of the light shielding plate disposed on a plane which is orthogonal to the projection light, to adjust brightness of the image on the screen.

As above, if it is tried to adjust a light amount by sliding the light shielding plate (mask member), which was disposed on the plane which is orthogonal to the projection light path, as in the above-described Patent Document 2, on the occasion of adjusting a light amount of a light path which is projected by the projection lens, by use of the light shielding plate, it becomes necessary to have a space in which the light shielding member (wing shaped mask plate etc.) goes back and forth and an allocation space of a drive mechanism which opens and closes this light shielding member, on a side portion of the projection lens.

On one hand, a projection lens is normally of a circular shape, and incorporated into a mirror tube section, and therefore, a light amount adjusting apparatus is to be projected to the side of the lens. Therefore, it brought about an undesirable result for miniaturization and space saving of an apparatus. In order to solve the such problems, this invention is such a thing that a pair of light shielding plates (wing members) are disposed on left and right sides of a light path which is projected on a screen by a projection lens, and an opening amount of the light path is adjusted by swinging this light shielding plate in a traveling direction of the light path, and thereby, it was made on the basis of such knowledge that space saving and miniaturization of an apparatus are realized, as compared with such a case that a light shielding plate is configured to be movable back and forth in a plane which is orthogonal to a light path.

However, by adoption of the suchlike configuration, a next problem will newly occur. In sum, as shown in FIG. 11, it is difficult to apply accurate light amount control to a pair of wing members which can be rotated (swung), in a projection light path, in a traveling direction of this light path, due to backlash of a opening and closing mechanism, and in particular, it becomes difficult to carry out light amount adjustment in such a state that the opening of the light path was widely opened. FIG. 11($a$) is a state diagram in which the light path was fully opened, and FIG. 11($b$) is a state diagram in which the light path was fully closed. Consequently, as compared with such an entrance position that the light path was fully closed (FIG. 11($b$)), in case that a light amount adjusting unit 21$a$, 21$b$ was out of alignment with an angle $\Phi$ toward the inside, due to backlash etc., in such a retreat position that the light path was fully opened (FIG. 11($a$)), a part of the light amount adjusting unit 21$a$, 21$b$ gains entry into an inside with position $\Delta 2$, and it is impossible to block a light amount to carry out appropriate light amount adjustment. As to this misalignment, for example, in case of assuming that a plate length Lo of the light amount adjusting unit 21$a$, 21$b$ is 10 mm and misalignment angle $\Phi$ is 5 degree, misalignment amount $\Delta 2$ becomes approximately 0.87 mm ($\Delta 2 = $Lo$\times \tan \Phi$) at the retreat position (FIG. 11($a$)), and misalignment amount $\Delta 1$ becomes approximately 0.04 mm ($\Delta 1 = $Lo$(1-\cos \Phi)$) at the entrance position (FIG. 11($b$)), and misalignment is incomparably large at the fully opened retreat position (FIG. 11($a$)), as compared with that at the fully closed entrance position (FIG. 11($b$)), and it becomes necessary to eliminate the misalignment at this fully open retreat position (FIG. 11($a$)).

The invention has as an object a provision of a light amount adjusting apparatus in which, on the occasion of forming small-size and space saving of an apparatus by swinging a pair of light amount adjusting members, which were disposed at a peripheral side rim portion of a projection light path, there occurs no fluctuation of a light amount, by a dimensional error due to a body difference or backlash of a wing member for use in light amount adjustment, and small-size and space saving of the apparatus is realized and at the same time, light amount adjustment is easy and accurate, and a projector which uses this light amount adjusting apparatus.

SUMMARY OF THE INVENTION

In order to accomplish the above-described object, in a first aspect which relates to a light amount adjusting apparatus of the invention, at least a pair of light amount adjusting plates are allocated on a peripheral side rim portion of a light path through which light from a light source is projected. These light amount adjusting plates are supported on a pair of rotation supporting shafts, which were allocated on opposing side rim portions of the above-described light path, so as to be able to swing in a traveling direction of the light path. Then, disposed is a drive unit which drives to open and close these light amount adjusting plates between such a narrow-down position that they entered in the light path and such a retreat position that they retreated to an outside of the light path, and disposed are a restriction member such as a stopper member which restricts rotation of the light amount adjusting plate at the retreat position, and a holding unit which holds the light amount adjusting plate to this restriction member. By this means, the light amount adjusting plates are to swing with a predetermined angle in a traveling direction of light from left and right side rims, to adjust a light amount, and there occurs no such cases that this light amount adjusting plate is projected in a direction which is orthogonal to the light path, and in this case, the light amount adjusting plate is restricted by the restriction member at the retreat position and held by the holding member, and therefore, there is no such fear that it vibrates by backlash and an external shock.

A second aspect is such a thing that, in the above-described first configuration, the restriction unit is configured by a stopper member which blocks a predetermined angle or more turn of the light amount adjusting plate, and the holding unit is configured by a biasing unit such as a spring and a magnet which bias the light amount adjusting plate to this stopper member, and by this means, it is possible to surely hold the light amount adjusting plate, and a mechanism for that purpose becomes simple.

A third aspect is such a thing that, in the above-described first configuration, the drive unit is configured by a drive source such as a motor, and a transmission member which transmits a drive force of this drive source to the light amount adjusting plate, and a biasing unit, which biases the light amount adjusting plate to the restriction member, is disposed on this transmission member, and by this means, it is possible to configure the biasing unit by the transmission member, at the same time of transmission of the drive force, and an apparatus configuration becomes simple and compact.

A fourth aspect is such a thing that, in the above-described third configuration, the transmission member is allocated in a direction which is nearly orthogonal to this drive rotation shaft, and coupled so as to transmit drive of the drive rotation shaft to the above-described each rotation supporting shaft, and by this means, a pair of the rotation supporting shaft and the drive rotation shaft are allocated in nearly parallel, respectively, on left and right side rims which are opposing, sandwiching the light path in between, and the light amount adjusting plate and a drive device such as a motor are integrated compactly so as not to be projected toward the side of the light path, and it is possible to accomplish the above-described problem.

A fifth aspect is such a thing that, in the above-described fourth configuration, the transmission member is disposed so as to be able to carry out a back-and-forth movement in a direction which is nearly orthogonal to the pair of rotation supporting shafts, and the rotation supporting shafts are rotated with a given amount, respectively, by the back-and-forth movement of the transmission member due to the drive rotation shaft, and by this means, the transmission member is allocated at a lower part or upper part peripheral rim of the light path, and is to transmit drive to the pair of rotation supporting shafts, by its movement, and it is possible to configure a transmission mechanism simply.

A sixth aspect is such a thing that, in the above-described fourth configuration, the transmission member is configured by a rack which can move back and forth in a direction which is nearly orthogonal to the pair of rotation supporting shafts, and a pinion, which gears with the rack, is disposed on the pair of rotation supporting shafts, and the pair of light amount adjusting plates are equipped with restriction members which restrict a turn at the retreat position where they were retreated from an inside of the light path, and a biasing member, which holds the light amount adjusting plate to this restriction member, is disposed on the rack, and by this means, it is possible to bias and hold the light amount adjusting plate to the restriction member under the action of the rack which transmits drive of the drive rotation shaft to the rotation supporting shaft.

A seventh aspect is such a thing that, in the above-described first configuration, the pair of light amount adjusting plates are disposed at opposing left and right side rim portions and up and down side rim portions of the light path, respectively, and this each light amount adjusting plate is supported on the rotation supporting shaft, so as to be able to turn in a traveling direction of the light path, respectively, and by this means, the pair of light amount adjusting plates are allocated on left and right and up and down sides of the light path, respectively, and a light amount is to be small and large adjusted, with such a relation that it is nearly uniform on left and right and up and down sides to a center of the light path.

An eighth aspect is such a thing that, in the above-described first configuration, the pair of light amount adjusting plates form an opening which is nearly uniform toward left and right, and up and down sides from a center of the light path, and are supported so as to turn back and forth in a traveling direction of the light path, centering on a pair of rotation supporting shafts, which were allocated at both side rims of that light path in nearly parallel to each other, and the drive rotation shaft is allocated in nearly parallel to the rotation supporting shaft, and the transmission member is allocated in a direction which is nearly orthogonal to this drive rotation shaft, and it is configured so as to transmit the rotation of that drive rotation shaft to the pair of light amount adjusting plate, respectively, and by this means, a pair of the rotation supporting shafts and the drive shaft are allocated in nearly parallel at left and right side rims which are opposing, sandwiching the light path in between, respectively, and the light amount adjusting plate and a drive device such as a motor are integrated compactly so as not to be projected toward the side of the light path, and it is possible to accomplish the above-described problem.

A ninth aspect is such a thing that, in the above-described eighth configuration, the pair of light amount adjusting plates stand face to face, each other, with a space in between, and openings are formed in that faced end portions, respectively.

A tenth aspect is such a thing which is equipped with at least a pair of light amount adjusting plates which were allocated at a peripheral side rim portion of a light path through which light from a light source is projected, a pair of rotation supporting shafts which support the light amount adjusting plates swingably in a traveling direction of the light path and which were allocated at opposing side rim portions of the light path, a drive unit which drives to open and close the light amount adjusting plates between such a narrow-down position that they entered in the light path and such an retreat position that they retreated to an outside of the light path, and a restriction member which block a predetermined angle or more turn of the light amount adjusting plate at the retreat position, and in which the drive unit is configured by a motor which has a drive rotation shaft, a first transmission lever which carries out aback-and-forth movement with a predetermined amount, by rotation of this drive rotation shaft, and a second transmission lever member which transmits a movement of this first transmission member to the light amount adjusting plate, and between the first transmission lever member and the second transmission lever member, disposed is a biasing unit which biases the light amount adjusting plate to the restriction member at the retreat position, and by this means, it is possible to obtain a similar result to that of the aspect of claim 3.

An eleventh aspect is such a thing that, in the above-described tenth configuration, the motor is configured by a stepping motor, and the light amount adjusting plate is held at the narrow-down position by a magnetic attracting torque at the time of non-power distribution thereof, and by this means, a special mechanism for holding the light amount adjusting plate to the narrow-down position is not necessary, and furthermore, there is a few influence of fluctuation of light amount adjustment etc.

A twelfth aspect relates to a projector, and is a thing which is equipped with an image forming unit which forms an image, a projection light path through which light from a light source is irradiated to and projected on the image forming unit, at least a pair of light amount adjusting plates which were allocated at opposing side rim portions of this projection light path, a pair of rotation supporting shafts which support the light amount adjusting plates swingably in a traveling direction of the light path and which were allocated at opposing side rim portions of the light path, and a drive unit which drives to open and close the light amount adjusting plates between such a narrow-down position that they entered in the light path and such an retreat position that they retreated to an outside of the light path and in which disposed were a restriction member which restrict a turn of the light amount adjusting plate at the retreat position, and a holding unit which holds the light amount adjusting plate to this restriction member, and by this means, it is possible to configure a projector in small-size and compact.

A thirteenth aspect is such a thing that, in the above-described twelfth configuration, the light amount adjusting wings are supported so as to turn in a traveling direction of the light path on a pair of rotation supporting shafts which were allocated in nearly parallel to each other, at both side rims of the projection light path, and the drive rotation shaft is allocated in nearly parallel to the rotation supporting shaft, and it is configured so as to transmit rotation of the drive rotation shaft to the above-described each rotation supporting shaft, respectively, by a transmission member which was allocated in a direction which is nearly orthogonal to this drive rotation shaft, and by this means, it becomes possible to provide a small-size and compact projector.

A fourteenth aspect is such a thing that, in the above-described twelfth configuration, the pair of light amount adjusting plates stand face to face, each other, with a space in between, and openings are formed in that faced end portions, respectively.

BRIEF DESCRIPTION OF THE DRAWINGS

FIGS. 7(a) and 7(b) are sectional explanatory diagrams which show a relation of a restriction member and a light amount adjusting plate in the apparatus of FIG. 4;

FIGS. 10(a) and 10(b) show modes of a transmission member which is different from the transmission member in the apparatus of FIG. 3, wherein FIG. 10(a) is an exploded perspective view of the transmission member, and FIG. 10(b) is a sectional explanatory diagram which shows a relation of a restriction member and a light amount adjusting plate;

FIG. 11(a) is an explanatory diagram which shows a relation with a light amount adjusting area at the time that the light amount adjusting plate is located at the retreat position, and FIG. 11(b) is an explanatory diagram which shows a relation with a light adjusting area at the time that the light amount adjusting plate is located at the narrow-down position; and FIGS. 12(a)-12(c) are explanatory diagrams which show modes of a light amount adjusting plate which is different from that in the apparatus of FIG. 3, wherein FIG. 12(a) is a state view at the time that the light amount adjusting plate is located at the retreat position, FIG. 12(b) is a state view at the time that the light amount adjusting plate moves from the retreat position to the narrow-down position, and FIG. 12(c) is a state view at the time that the light amount adjusting plate is located at the narrow-down position.

DETAILED DESCRIPTION OF PREFERRED EMBODIMENTS

Hereinafter, preferred embodiments of the invention will be described on the basis of the drawings.

Figure 1:
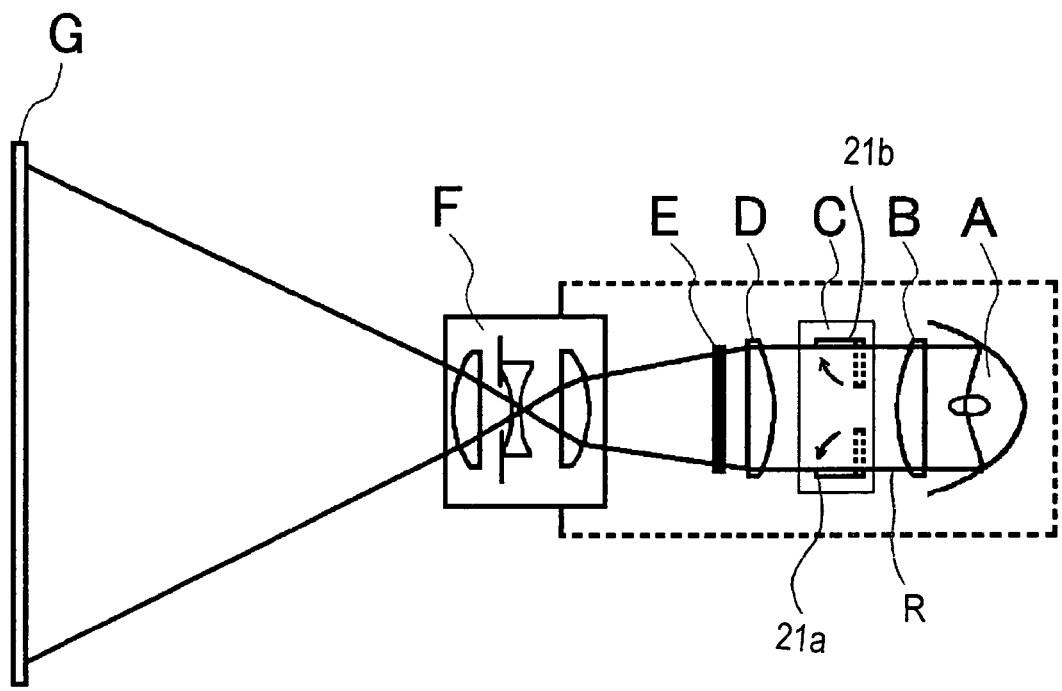
FIG. 1 is a layout explanatory diagram of one embodiment of a projector which relates to the invention.
Figure 2A:
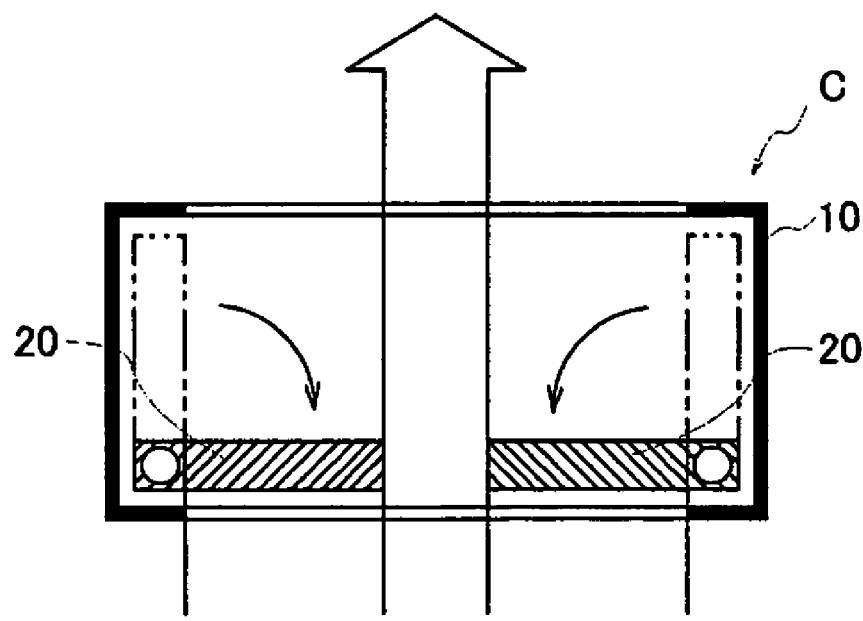
FIGS. 2(a) and 2(b) are explanatory diagrams of an operational principle of a light amount adjusting apparatus which relates to the invention.
Figure 2B:
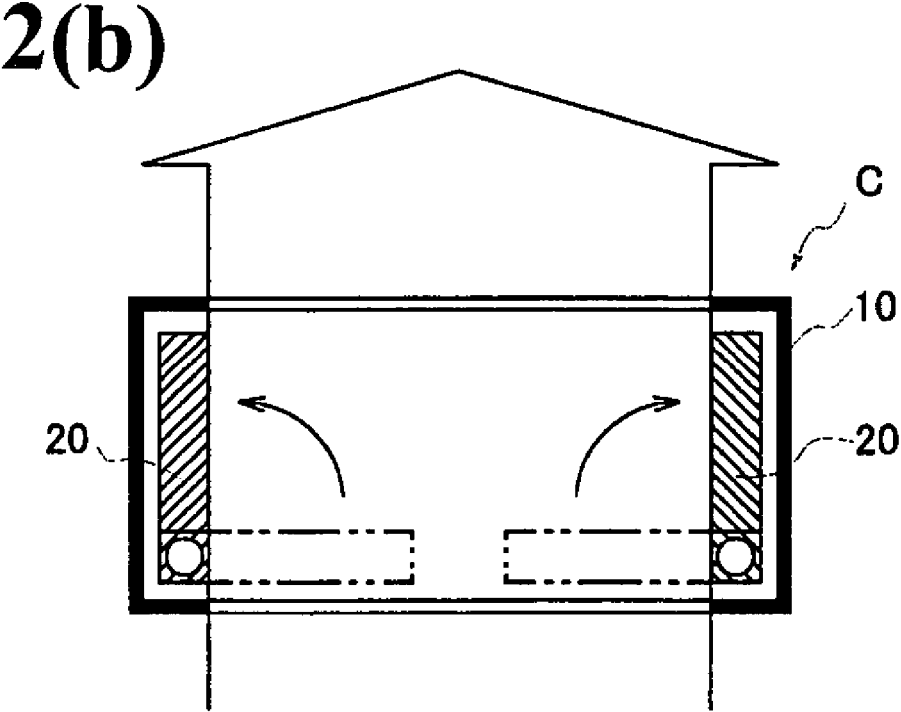
Figure 3:
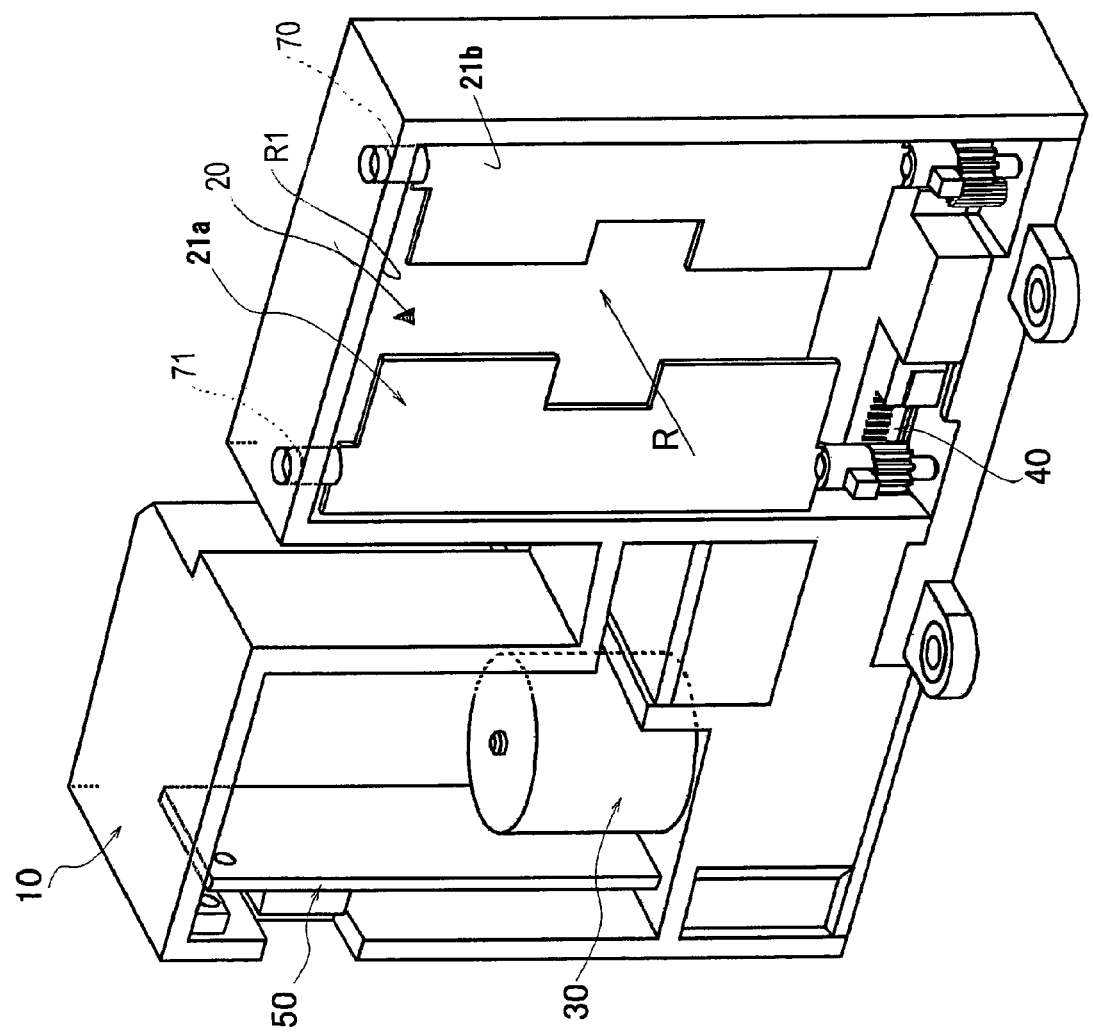
FIG. 3 is a perspective view which shows an entire configuration in the apparatus of FIGS. 2(a) and 2(b)

FIG. 1 is a schematic block diagram of a projector which used the invention, and FIGS. 2(a) and 2(b) are conceptual explanatory diagrams of light amount adjustment thereof, and FIG. 3 is an overall explanatory diagram of a light amount adjusting apparatus. In FIG. 1, a projector is configured by a light source A, a condenser lens B which converts light from this light source A into parallel light rays, an illumination optical system D including a dichroic mirror which color-luminosity separates light from this lens B, a liquid crystal panel E which receives light from this illumination optical system D, and a projection lens F which project light which passed through this liquid crystal panel E. Various methods are known for configuring this projection optical system, and a light source section (light source A etc.), an image forming section (liquid crystal panel E etc.) and a projection section (projection lens F etc.) are incorporate in a casing with an arbitrary configuration, and thereby, a projector is configured.

A light amount adjusting apparatus C, which is embedded in the suchlike projector, is incorporated, for example, between the condenser lens B and the illumination optical system D with the following configuration.

The light amount adjusting apparatus C shown in FIG. 3 is configured as such a unit that a light amount adjusting plate 20, a drive device 30 and a transmission mechanism 40 were incorporated in a framework frame 10 which surrounds a periphery of a light path R of the projector.

The framework frame 10 is formed in such a shape that it is incorporated in the projector with an arbitrary resin material, and is equipped with an opening section R1 of the light path R. At opposing left and right side rims of the opening section R1, a pair of light amount adjusting plates 21a, 21b are allocated so as to form an opening diameter of the opening section R1. These light amount adjusting plates 21a, and 21b are formed by punching of a resin film material or punching of a thin metal plate (e.g., aluminum alloy), and black color surface processing is applied thereto. A shape of this light amount adjusting plate 21a, 21b is formed so as to be able to obtain an opening which is nearly uniform on left and right, and up and down sides from a center of the light path R.

In sum, referring to FIGS. 1-3, a center of the light path R is determined from centers of the condenser lens B and the projection lens F, and a shape of the light amount adjusting plate 21a, 21b is determined so as to form an opening which is nearly uniform, left and right, and up and down, to the center of this light path R. In one embodiment shown in FIG. 3, an image to be projected is of a rectangular shape, and therefore, a shape of this light amount adjusting plate 21a, 21b is also formed in a rectangular shape. Then, these left and right pair of light amount adjusting plates 21a, 21b are bearing-supported on the framework frame 10 by rotation supporting shafts 70, 71. In the framework frame 10, formed is a bearing hole in which a protruding pin, which is formed integrally with the light amount adjusting plates 21a, 21b, fits, and both sides of the light amount adjusting plates 21a and 21b are bearing-fitted up rotatably. Therefore, the left and right pair of light amount adjusting plates 21a, 21b are to turn, centering on the rotation supporting shafts 70 and 71, in a FIG. 3 arrow direction (traveling direction of the light path), and to open and close like double doors opening outward.

Meanwhile, the rotation supporting shafts 70 and 71, which were configured by the above-described protruding pin, are allocated in parallel to each other at opposing peripheral side rims of the light path R, as shown in FIG. 3, and the light amount adjusting plates 21a, 21b are formed so as to produce a left-to-right symmetrical appearance as to its shape as well as an opening and closing operation.

Referring to FIGS. 3-6, a drive motor 31 is attached to the framework frame 10, and its drive rotation shaft 33 is located in nearly parallel to the rotation supporting shafts 70, 71 of the light amount adjusting plates 21a, 21b. Therefore, the rotation supporting shafts 70, 71 of the light amount adjusting plates 21a, 21b are located in parallel at both left and right side portions to the light path R, and the drive motor 31 is to be allocated in such a matter that the drive rotation shaft 33 becomes parallel to these both supporting shafts. The drive motor 31, which is shown in the figures, is constituted with a stepping motor, and a pulse generator and a counter circuit of a power supply are incorporated in its control substrate (driver circuit) 50. The control substrate 50, in which these control circuits were incorporated, is also incorporated in the framework frame 10 so as to become nearly parallel to the drive rotation shaft 33.

The reason of allocating the left and right pair of rotation supporting shafts 70, 71, the drive rotation shaft 33, and further, the control substrate 50 in parallel (collaterally) at a distance, respectively, on a plane which is orthogonal to the light path R is that a space, in which each constituent component occupies, is reduced as much as possible, and it is all right if these are allocated in nearly parallel, in tune with a shape of the light path R.

Then, a transmission mechanism which couples the above-described drive rotation shaft 33 and the rotation supporting shafts 70, 71 of the light amount adjusting plates 21a, 21b, will be described.

Figure 4:
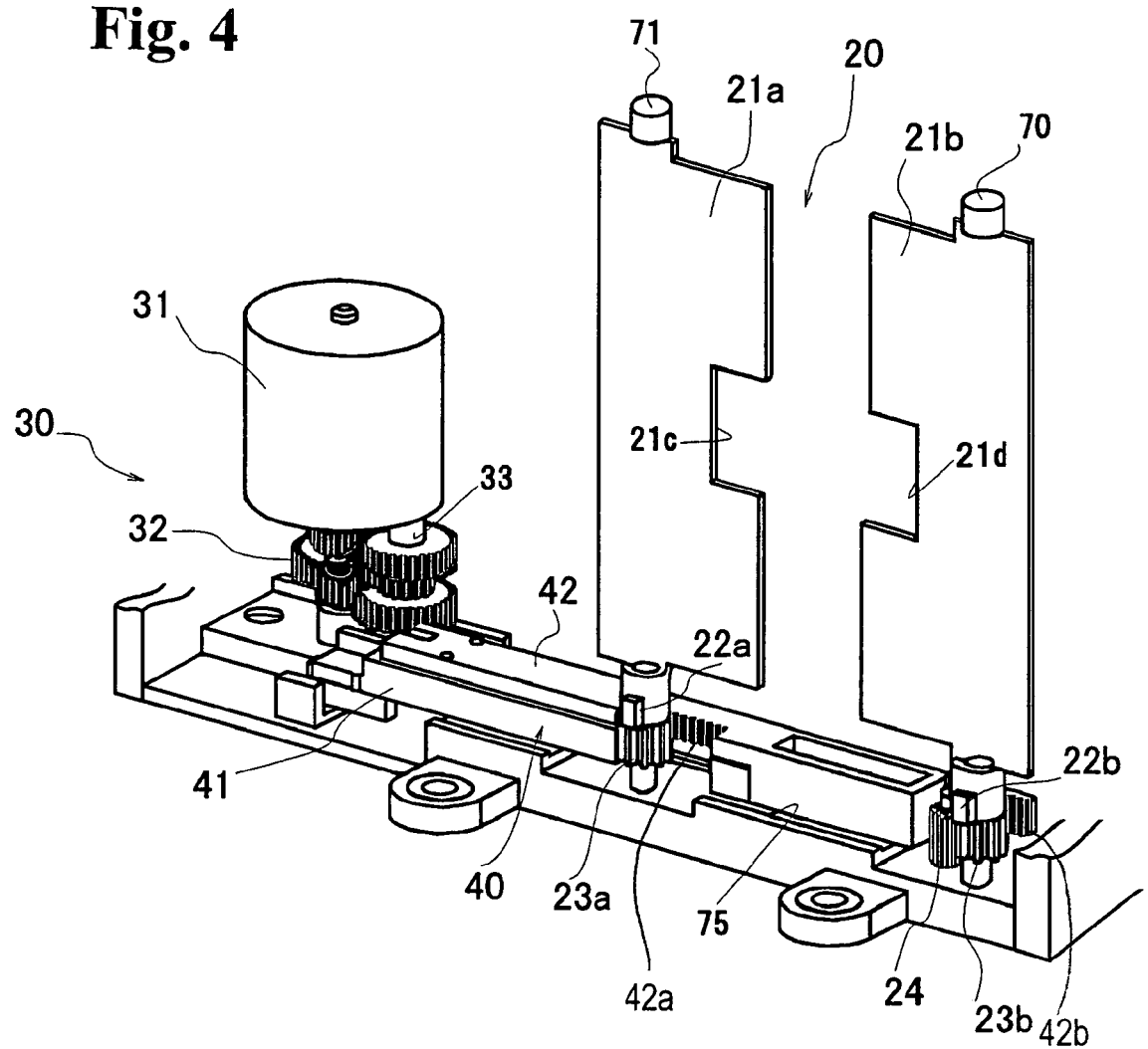
FIG. 4 is a perspective view which shows a substantial part in the apparatus of FIG. 3.
Figure 5:
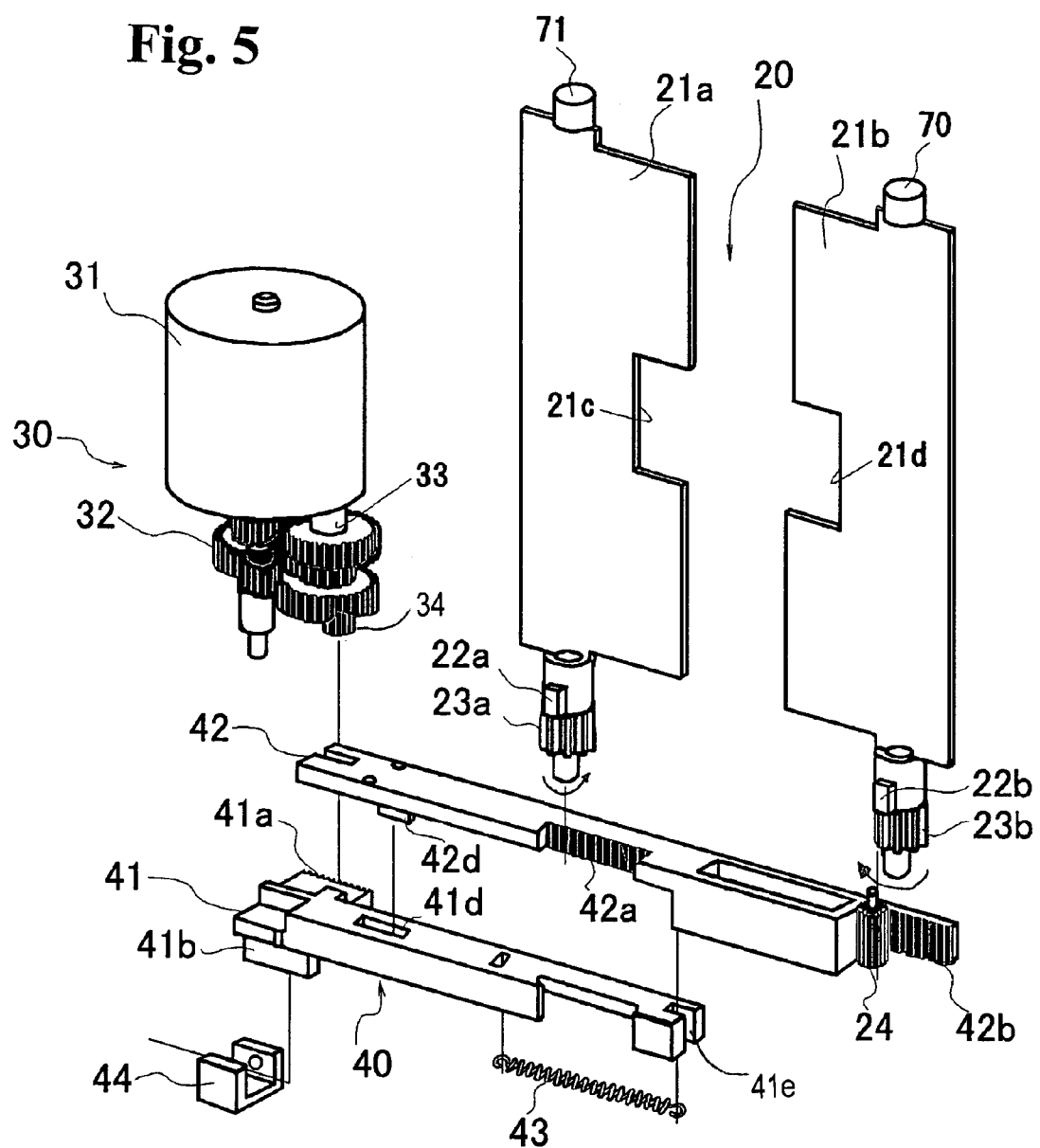
FIG. 5 is an exploded perspective view in the apparatus of FIG. 4.
Figure 6:
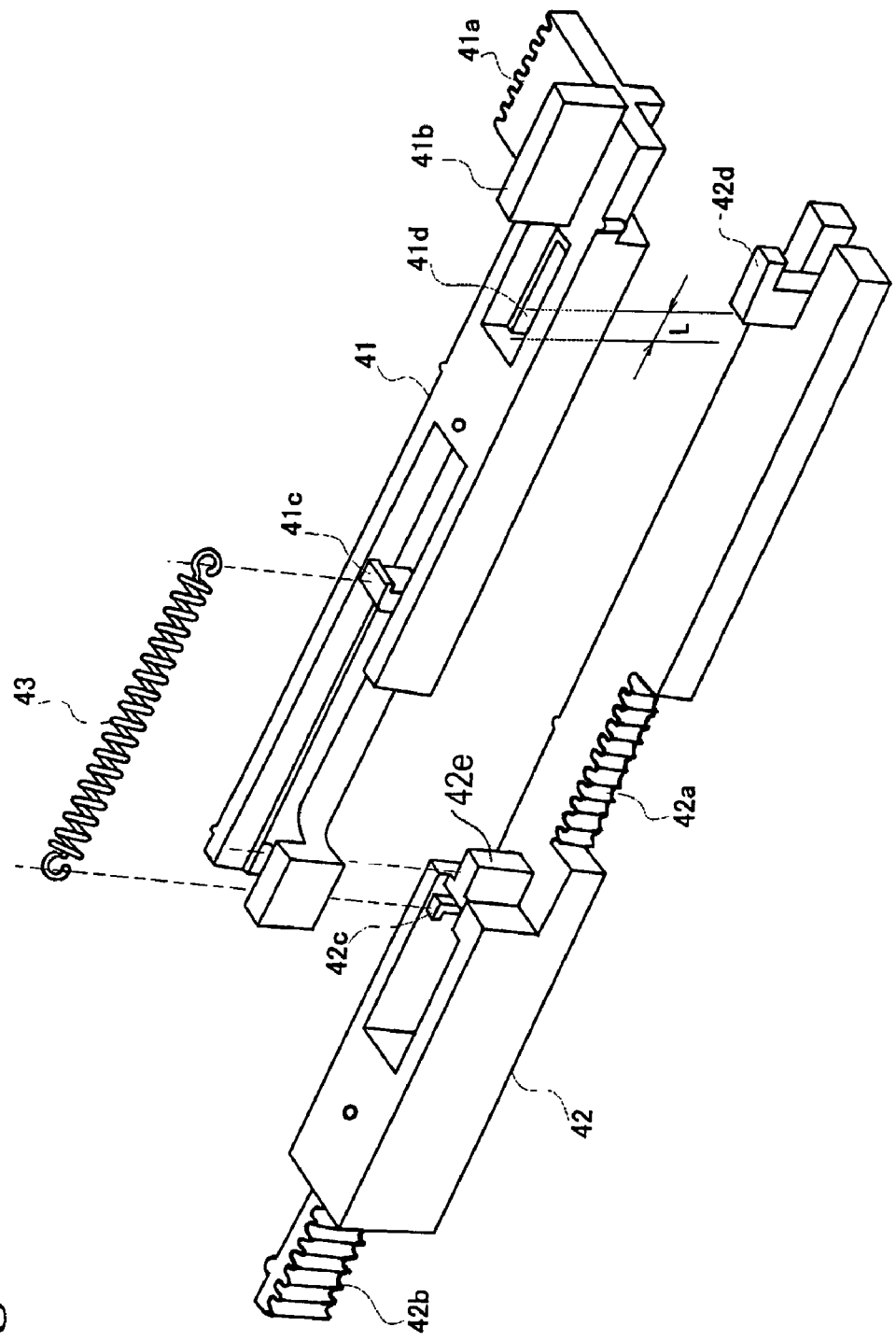
FIG. 6 is an exploded perspective view which shows aback surface side configuration of a transmission member in the apparatus of FIG. 4.
Figure 8:
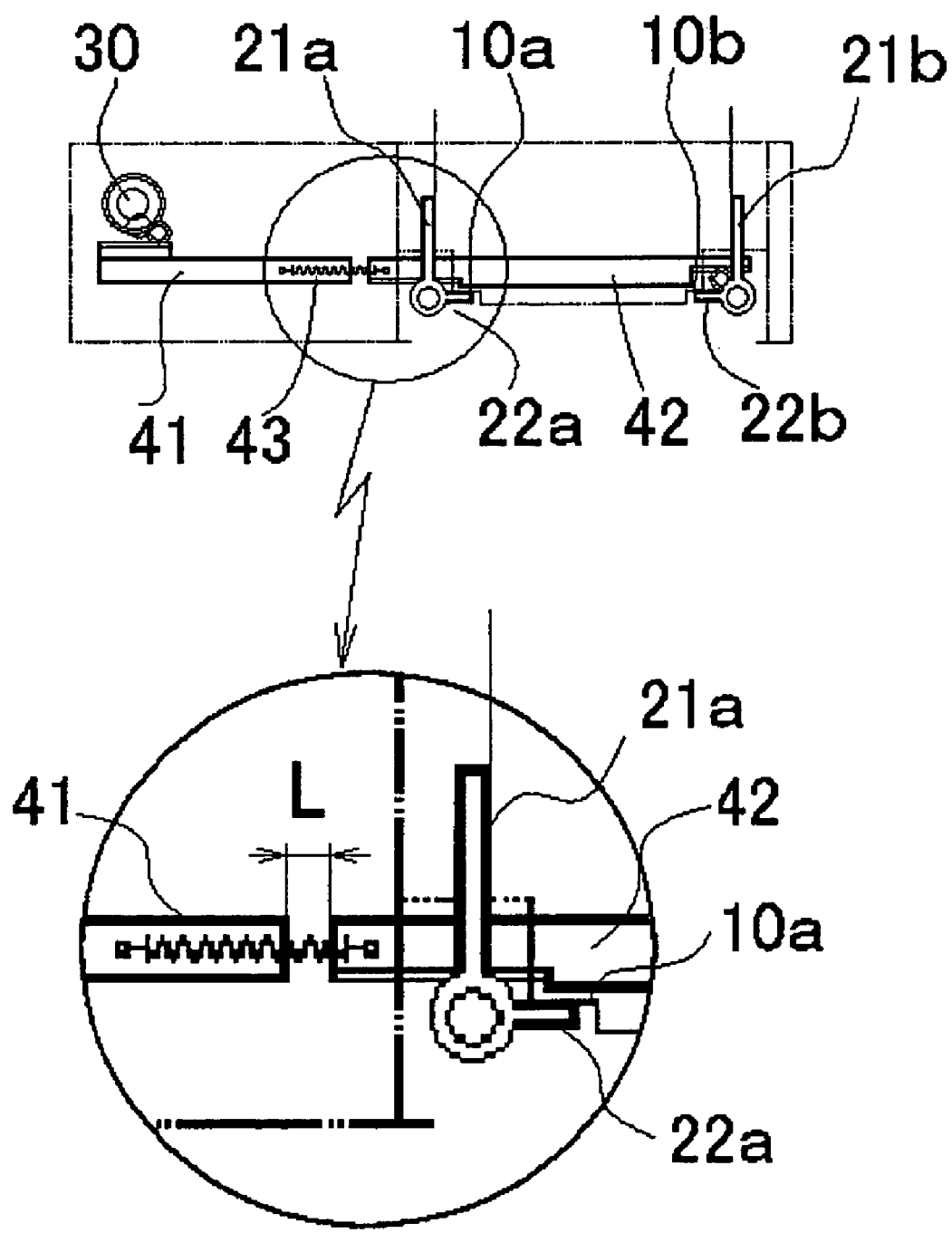
FIG. 8 is a plan view which shows a relation with the transmission member at the time that the light amount adjusting plate is located at a retreat position.
Figure 9:
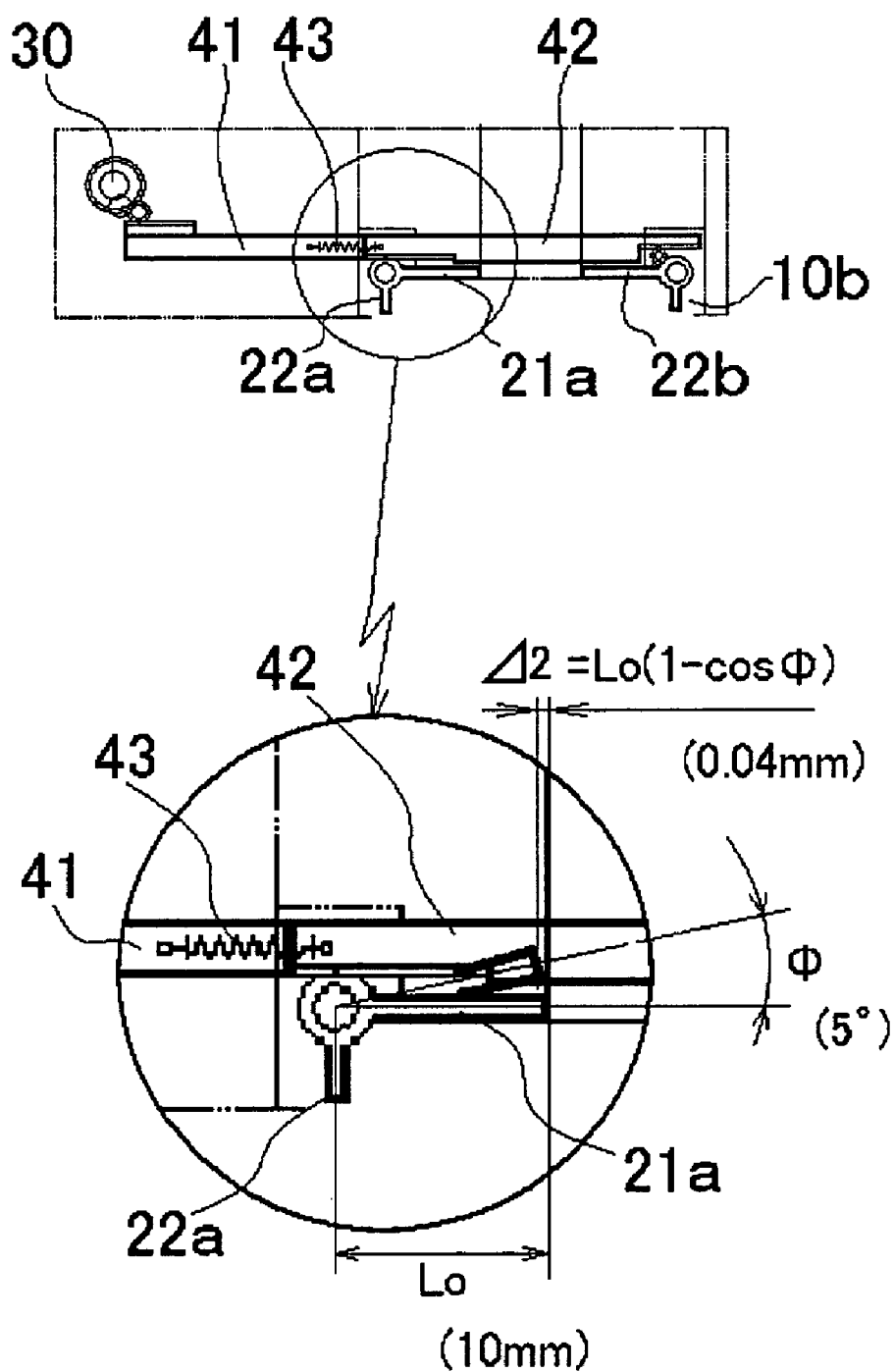
FIG. 9 is a plan view which shows a relation with the transmission member at the time that the light amount adjusting plate is located at a narrow-down position.

Firstly, to the drive rotation shaft 33, a drive force from an output shaft of the drive motor 31 is transmitted through a speed reduction gear 32, and a pinion 34 for output is disposed on this drive rotation shaft 33. Then, a transmission member 40, which is equipped with a rack gear 41a which gears with this pinion 34, is to transmit rotation of the drive motor 31 to the rotation supporting shafts 70, 71. The transmission member 40, which is shown in FIGS. 4-6, is configured by a first transmission lever 41 (hereinafter, referred to first lever) and a second transmission lever 42 (hereinafter, referred to as second lever), and these two lever members are joined to each other to be integrated. A rack gear 41a is formed in the first lever 41, and engages with the pinion 34 of the drive rotation shaft 33, and rack gears 42a and 42b are disposed in the second lever 42, and the pinion 23a, which was disposed in the rotation supporting shaft 71 of the light amount adjusting plate 21a, engages with the rack gear 42a, and the pinion 23b, which was disposed in the rotation supporting shaft 70, engages with the rack gear 42b, respectively, and thereby, they are coupled. Then, an engagement protrusion 42d of one and a long groove 41d of the other are fitted in such a manner that the first lever 41 and the second lever 42 move relatively each other with a small stroke, and both sides are coupled.

In sum, long grooves 41d and 41e are formed in the fist lever 41, and protrusions 42d and 42e are formed on the second lever 42, and the long groove and the protrusion 42d, the long groove 41e and the protrusion 42e fit with each other, respectively, and the first, second levers 41, 42 become movable relatively in a FIG. 5 left-to-right direction, with a stroke L of the long grooves 41d, 41e. Then, a bias spring 43 is bridged between a latch protrusion 41c of the first lever 41 and a latch protrusion 42c of the second lever 42, between the first lever 41 and the second lever 42, and the first, second levers 41, 42 are to move relatively within the above-described stroke L, against this bias spring 43.

This is because, when the first lever 41 is moved in a left direction by the pinion 34 of the drive rotation shaft 33, the second lever 42 is moved in a right direction against the bias spring 43, and after this second lever 42 bumped into a restriction stopper of the light amount adjusting plates 21a, 21b, which will be described later, the bias spring 43 increases in length, and the second lever 42 and the light amount adjusting plates 21a, 21b which were gear-coupled to this are biased in one direction (restriction stopper side) by a spring force.

The first, second levers 41, 42, which were integrated in this way, are fitted and held by a concave groove shaped guide rail 75 which was formed in a bottom portion of the framework frame 10 as shown in FIG. 4, and are incorporated movably along the guide rail 75 in a left-to-right direction shown in the figure.

Then, rack gears 42a and 42b are formed in the second lever 42, and the gear 42a is to gear with a pinion gear 23a which was attached to the rotation supporting shaft 71 of the light amount adjusting plate 21a, and the other gear 42b is to gear with a gear 24 which gears with a pinion gear 23b attached to the rotation supporting shaft 71 of the light amount adjusting plate 21b. This gear 24, which gears with the pinion gear 23b of the rotation supporting shaft 71, is attached to a middle shaft which was supported by the frame 10. Therefore, when the second lever 42 moves in a FIG. 5 left direction, the gear 23b of the rotation supporting shaft 70 is to rotate clockwise through the gear 24 of the middle shaft, and the gear 23a of the rotation supporting shaft 71 is to rotate counterclockwise.

On one hand, the above-described pair of light amount adjusting plates 21a, 21b are supported by the rotation supporting shafts 70, 71, respectively, and attached to the framework frame 10 rotatably, but protrusions 22a, 22b are disposed on these rotation supporting shafts 70, 71. This protrusion 22a, 22b rotates within a predetermined angle range, by restriction stoppers (restriction members) 10a, 10b (FIGS. 7(a)-9) which were disposed on the framework frame 10 supporting each supporting shaft. Explaining this on, the basis of FIGS. 2(a) and 2(b), the pair of light amount adjusting plates 21a, 21b, which are allocated at opposing side rim portions of the light path R, are set up so as to open and close between a narrow-down position of the FIG. 2(a) and a retreat position of the FIG. 2(b) in a traveling direction of the light path R, centering on the rotation supporting shafts 70, 71.

Therefore, the light path R is narrowed down to a minimum bore diameter at such a position that the light amount adjusting plates 21a, 21b are nearly orthogonal to the light path R, so that an amount of light which is passing through becomes minimum, and the light path R becomes a maximum bore diameter at such a retreat position that the light amount adjusting plates 21a, 21b are nearly parallel to a traveling direction of the light path R, so that an amount of light which is passing through becomes maximum. Then, if the rotation supporting shafts 70, 71 are turned stepwise within 90 degree, respectively, it becomes possible to adjust a light amount of the light path R.

Then, protrusions 22a, 22b are disposed on each rotation supporting shaft 70, 71, and restriction stoppers 10a, 10b are disposed on the framework frame 10. This protrusion and stopper are to be in contact with each other when the light amount adjusting plates 21a, 21b are at the retreat position (fully opened position) as shown in FIGS. 7(a)-9, and the stopper blocks abut with the rotation supporting shafts 70, 71 to prevent further rotation. Together with this, speaking about the rotation supporting shafts 70, 71, each supporting shaft is to be biased to the restriction stoppers 10a, 10b side, when the bias spring 43, which was bridged between the first lever 41 and the second lever 42, is at the retreat position. Therefore, at the time of the retreat position (FIG. 7(b)), the light amount adjusting plates 21a, 21b are biased to the restriction stoppers 10a, 10b side by a biasing force of the bias spring 43, and held at that position without moving even if an external shock is applied thereto.

Then, explaining about control of the drive device 30, the drive device 30, which was configured by a stepping motor, is electrically connected to the control substrate 50 in which a pulse generation circuit, a power supply circuit etc. were incorporated. Then, on the first lever 41 which configures the transmission member, a position sensor 44, which detects its position, is disposed. As shown in FIG. 5, the position sensor 44, which was configured by a photo-coupler, is attached to the framework frame 10, and on the first lever 41, an actuator 41b, which comprises a protrusion, is disposed. Then, when the light amount adjusting plates 21a, 21b are located at the narrow-down position, the position sensor 44 is to be turned ON by the actuator 41b as a home position.

Then, in the state of FIG. 4, when the drive motor 31 rotates the pinion gear 34 of the drive rotation shaft 33 counterclockwise through the speed reduction gear 32, the rack gear 41a, which geared with this, moves the first lever 41 in a left direction, and moves also the second lever 42 through the bias spring 43. Then, the rack gear 42a, which is formed in the second lever 42, rotates the pinion gear 23a of the rotation supporting shaft 71 counterclockwise, and rotates the light amount adjusting plate 21a from the narrow-down position to the retreat position, centering on the rotation supporting shaft 71. In the same manner, the rack gear 42b, which is formed in the second lever 42, rotates the pinion gear 23b of the rotation supporting shaft 70 clockwise, through the gear 24 of the middle shaft, and rotates the light amount adjusting plate 21b from the narrow-down position to the retreat position, centering on the rotation supporting shaft 70. Then, when the protrusions 22a, 22b, which were formed on each rotation supporting shaft 70, 71, engage with the restriction stoppers 10a, 10b, and block rotation more than that, the second lever 42 comes to rest, and on one hand, the first lever 41 further moves in a left direction, and the bias spring 43 increase in length to store forces. An over run amount of this first lever 41 is set up within a range of the stroke L which was formed by the long groove 41d in advance. In this state, when power distribution to the drive motor 31 is cut off, a stepping motor stops within a predetermined phase angle range, and a detent torque operates, and a biasing force, which was stored in the bias spring 43, operates as a force of moving the second lever 42 always to the FIG. 5 left side. Therefore, the biasing force always acts on the left and right light amount adjusting plates 21a, 21b as indicated by the arrow directions shown in FIG. 5.

Meanwhile, the stroke L between the first lever 41 and the second lever 42 is set up to be larger than a phase angle of the drive motor. In this case, in case that a stepping motor is not used as the drive motor, it is configured so as to have the drive motor come to rest by a burden of the motor and the speed reduction gear.

Next, when the drive motor 31 is reversed to rotate the drive rotation shaft 33 counterclockwise in FIG. 5, the first lever 41 moves in a FIG. 5 right direction, and after movement with the stroke L, a rim portion of the long groove 41d of the first lever 41 engages with the protrusion 42d of the second lever 42, and the second lever 42 also moves in a right direction. By the movement of this second lever 42 in a right direction, the rotation supporting shaft 71 rotates clockwise and the rotation supporting shaft 70 rotates counterclockwise, and the light amount adjusting plates 21a, 21b come back to the narrow-down position which is shown in FIG. 5. At this narrow-down position, postures of the light amount adjusting plates 21a, 21b are maintained by the detent torque of the drive motor 30 or a burden of the speed reduction gear.

Figure 10A:
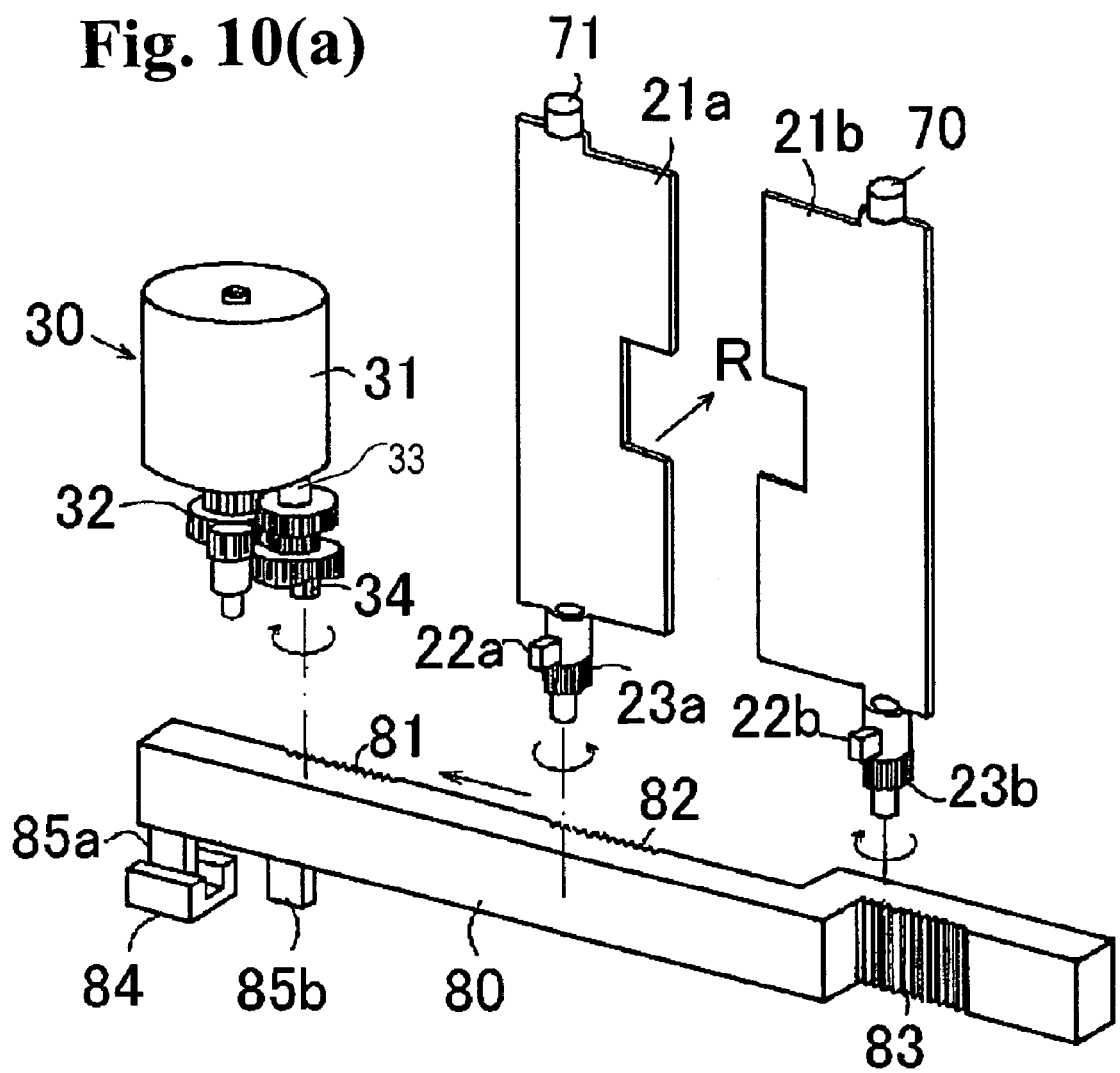
Figure 10B:
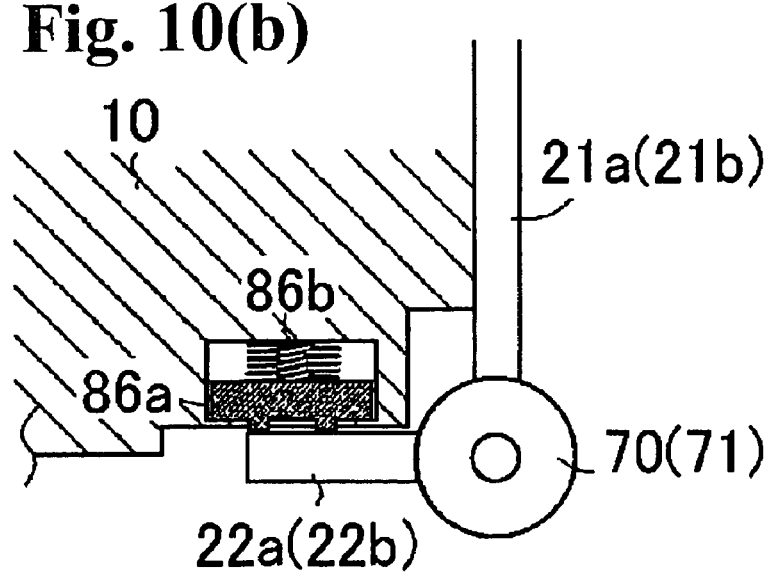

The transmission member 40, which was described above, was described as two slide members configured by the first lever 41, the second lever 42, and at the retreat position, one of them is made to overrun, to store forces in the spring, and the pair of light amount adjusting plates are elastically biased to the restriction stoppers at the retreat position, but it is also all right even if it is of a configuration shown in FIGS. 10(a) and 10(b).

In FIGS. 10(a) and 10(b), a pair of the light amount adjusting plates 21a, 21b are attached to the rotation supporting shafts 70, 71, and in the same manner as the above-described one, to the framework frame, at opposing side rim portions of the light path R. In addition, also as to the drive device 30, the stepping motor 31, the speed reduction gear 32, the drive rotation shaft 33 and the pinion gear 34 are attached to the framework frame in the same manner as the above-described one.

Therefore, the rotation supporting shafts 70 and 71 are allocated in parallel from left to right, sandwiching the light path R in between, and the drive rotation shaft 33 is also allocated in nearly parallel to these both supporting shafts 70, 71. Then, a movable transmission member 80 is disposed in a direction which is nearly orthogonal to these rotation supporting shaft and rotation shaft which were allocated in nearly parallel at a distance. This transmission member 80 is attached in such a manner that it engages with a rail which was formed in a lower frame of the framework frame, and is movable in a left-and-right direction of FIG. 10(a), although it is not shown in the figure. Then, rack gears 81, 82 and 83 are disposed in the transmission member 80, and the pinion gear 34 of the drive rotation shaft 33 gears with the rack gear 81, and the pinion gear 23a of the rotation supporting shaft 71 gears with the rack gear 82, and the pinion gear 23b of the rotation supporting shaft 70 gears with the rack gear 83.

The rack gears 82 and 83 are formed in the transmission member 80 in such a manner that the pinion gear 23a and the pinion gear 23b rotate in a reverse direction, at this time. As to one shown in the figure, the rack gear 82 is formed on one surface of the lever shaped transmission member 80 and the rack gear 83 is formed on the other surface thereof.

On one hand, protrusions 22a, 22b are formed on the rotation supporting shafts 70 and 71, in the same manner as the above-described one, and as shown in FIG. 10(b), a restriction member 86a is formed on the framework frame 10 at such a position that the light amount adjusting plates retreated. Then, the protrusions 22a, 22b of the both light amount adjusting plates are formed by a soft magnetic material, a piece of iron for one shown in the figure, and the restriction member 86a is formed by a magnet. Therefore, further rotation of the protrusions 22a, 22b is blocked by the restriction member 86a which comprises a magnet, and they are to be held at this position by a magnetic force of the magnet.

Meanwhile, the restriction member 86a is attached movably in a FIG. 10(b) up-and-down direction in a small allowance range, by applying a spring 86b to the framework frame 10. Then, in the state of FIG. 10, when the drive motor 31 is driven to rotate the pinion gear of the drive rotation shaft 33 clockwise shown in the figure, the transmission member 80 moves to the left side in the figure, through the rack gear 81 which geared with this. Then, the pinion gear 23a of the rotation supporting shaft 71, which geared with the rack gear 82, rotates counterclockwise, to move the light amount adjusting plate 21a from the narrow-down position shown in the figure to the retreat position. In the same manner, the pinion gear 23b of the rotation supporting shaft 70, which geared with the rack gear 83, rotates clockwise, to move the light amount adjusting plate 21b to the retreat position.

On the above-described transmission member 80, in the same manner as the above-described first lever, a position sensor 84 is configured by a photo sensor which was attached to the framework frame, and an actuator, which comprises protrusions 85a, 85b, is disposed on the transmission member 80 side. Then, the protrusion 85a is allocated so as to turn ON the sensor when the light amount adjusting plate is at the narrow-down position, and the protrusion 85b is allocated so as to turn ON the sensor when the light amount adjusting plate is at the retreat position.

Therefore, the drive motor 31 stops when the protrusion 85b turned ON the sensor 84. Then, the protrusions 22a, 22b of the rotation supporting shafts 70, 71 contact with the restriction member 86a, and further rotation is blocked so that they stop. Fluctuation of stop timing of the drive motor and such a position that the protrusions 22a, 22b contact with the restriction member 86a is absorbed by a spring 86b, and the light amount adjusting plates are held at the retreat position by a magnetic force of the restriction member 86a.

Such a case that a pair of the light amount adjusting plates, which were explained above, are allocated on left and right sides or up and down sides of the light path R, and opened and closed in a traveling direction of the light path R, like double doors opening outward was described above, but it is also all right even if a pair of them are formed on left and right sides of the light path R and furthermore, a pair of them are formed on up and down sides thereof, and this will be described in accordance with FIGS. 12(a)-12(c).

In one embodiment shown in FIGS. 12(a)-12(c), light amount adjusting plates 21a, 21b are disposed on left and right sides of the light path R at an opposing position, and light amount adjusting plates 60a, 60b are disposed on up and down sides of the light path R at an opposing position. The light amount adjusting plates 21a, 21b are supported rotatably on the framework frame 10 by rotation supporting shafts 70, 71 in the same manner as the above-described one, and the light amount adjusting plates 60a, 60b are also supported on the framework frame 10 by rotation supporting shafts 61, 62 in the same manner.

Then, the up and down light amount adjusting plates 60a, 60b engage with the left and right light amount adjusting plates 21a, 21b at end portions thereof as shown in FIG. 12(a), and established is such a relation that, when the left and right light amount adjusting plates 21a, 21b are turned, the up and down light amount adjusting plates 60a, 60b turn in conjunction with this.

Then, coil springs are disposed on the up and down light amount adjusting plates 60a, 60b between them and respective rotation supporting shafts 61, 62, so as to turn in an opposite direction to an arrow shown in the figure, and a drive rotation shaft and a transmission member, which are of the above-described configurations, are coupled to the left and right light amount adjusting plates 21a, 21b. Therefore, when the left and right light amount adjusting plates 21a, 21b are opened and closed under the similar control to the above-described one, the up and down light amount adjusting plates 60a, 60b are to be opened and closed, in conjunction with this.

Next, explaining about a configuration of a projector, as its schematic layout configuration is shown in FIG. 1, a light source A, which comprises a light source lamp such as a halogen lamp, a reflector which reflects diffusely light of this light source, and so on, is built in an apparatus casing, and light from this light source A is averaged by a condenser lens B, to form a light path R. Light of the light path R is irradiated through a condenser lens D to a liquid crystal panel E. The liquid crystal panel is formed in three layers by filters of three primary colors of R/G/B, and forms an image when it receives an image signal. Therefore, this liquid crystal panel is to configure an image forming section, and when it receives light from the light source A, projects an image on a screen G from a projection lens F. Then, in the projection lens F, a focusing mechanism for focusing is incorporated. Consequently, the above-described light amount adjusting apparatus is incorporated in the light path R between the condenser lens B and the condenser lens D, and allocated in such a manner that the light amount adjusting plates 21a, 21b open and close in a traveling direction of light.

On one hand, an illumination intensity sensor, which detects brightness, is disposed on the casing of the apparatus. It is all right if any method is applied to this illumination intensity sensor, including a method that detected light is light from the projection lens which was reflected by the screen G, a method in which external light other than projection light is detected, or a method in which a difference of brightness is detected by detecting both of them. As the illumination intensity sensor, a position sensor, which electrically detects an amount of light by use of a photo-electric conversion element, or a sensor such as CCD may be used.

On one hand, in a control section of the projector, an image signal processing section, which sends an image signal to the liquid crystal panel, is configured by an IC chip etc., and connected to an external computer and other video devices. In this control section, a controller is incorporated to perform focusing adjustment, or a function for adjusting an image interval, and at the same time, an operation panel is wire-connected thereto. Then, it is configured in such a manner that brightness is adjusted by a user operating a brightness adjustment button which was disposed on the operation panel, or at the same time of this, brightness is automatically adjusted by a detection signal from the illumination intensity sensor which detects external light.

Next, explaining its operation, the projector is powered on and an image is projected on the screen. A user takes a look at this image, and operates the brightness adjustment button on a control panel. Or, external light is detected by the illumination intensity sensor, and brightness adjustment, which was set up in advance, is carried out. Or, both of the external light and projection light which was reflected by the screen are detected by the illumination intensity sensor, and brightness adjustment is carried out from a difference of light amounts. In this way, when adjustment of brightness on the screen is instructed by the controller, the light amount adjusting apparatus carries out the following operation.

Firstly, the above-described drive device 30 is in such a state that a transmission member (the above-described first lever 41 or transmission member 80) stood still at a home position. This home position is, in one shown in the figure, set up to the retreat position, but it may be any one of the narrow-down position, or a middle point of the narrow-down position and the retreat position. Any one of the above-described manual (manual adjustment) and automatic adjustment signals is received from the home position which was set up in advance, and then, the control circuit 50 receives an activation signal with predetermined number of pulses, and supplies a pulsed power source to the drive motor 31. By this supply of the power source, the drive motor rotates by a predetermined angle. Then, the pinion gear 34 of the drive rotation shaft 33 rotates by a predetermined angle, to drive the rack gear 41a or 81 which geared with this, and to move the transmission member (first lever 41 or transmission lever 80) by a predetermined angle. By movement of this transmission member, the rotation supporting shafts 70, 71 rotate in an opposite direction by a predetermined angle, to move a pair of light amount adjusting plates by a predetermined angle. By movement of this light amount adjusting plate by a predetermined angle, a light amount of the light path R is adjusted so as to increase or decrease, and an image, which is projected on a screen, is to be adjusted so as to become brighter or darker.

In the such process, in the invention, a pair of light amount adjusting plates are supported on rotation supporting shafts so as to turn in a traveling direction of a light path, at opposing side rim portions of the light path R through which light from a light source is projected on a screen, and therefore, wing shaped light amount adjusting plates are to occupy a movement space in a traveling direction of the light path, to draw a movement trajectory as shown in FIGS. 2(a) and 2(b). At this time, the light amount adjusting plates are, at the narrow-down position of FIG. 2(a), held at that position by a detent torque of a motor or a burden of a speed reduction gear train, even after a supply power source to the drive motor 31 is turned OFF. At this, even if a force such as an external shock was applied, the light amount adjusting plates are in a direction which is nearly orthogonal to the light path R in a state of FIG. 11(b), and even if they are shifted with an angle Φ by an external involuntary shock, an influence, which is applied to a light amount of the light path R, becomes Δ1, and a large adjustment error of the light amount is not invited.

Figure 11A:
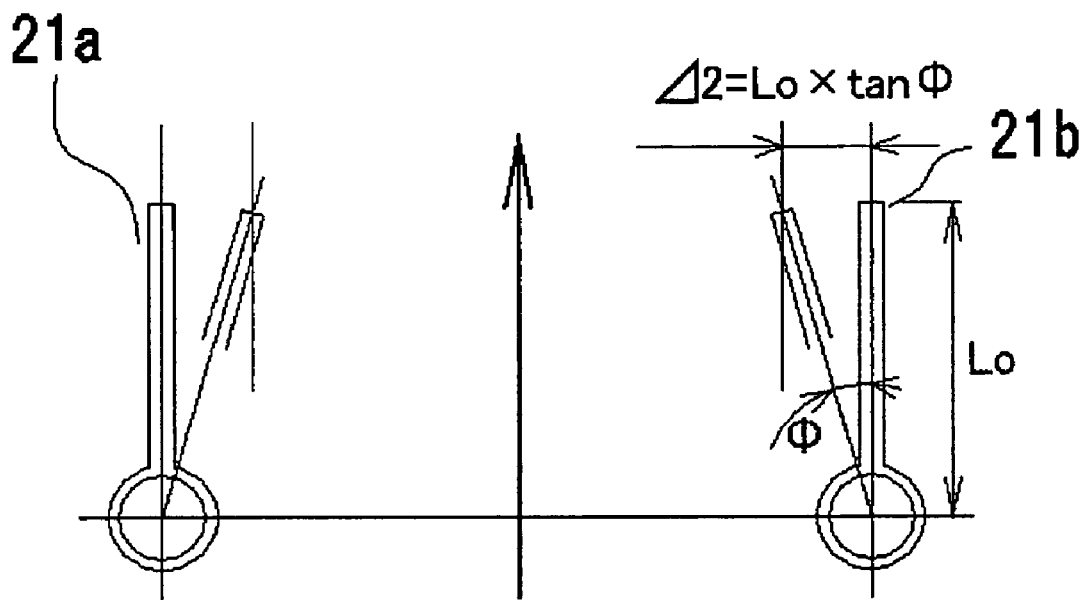
FIGS. 11(a) and 11(b) are explanatory diagrams of a relation of the light amount adjusting plate and a light amount.
Figure 11B:
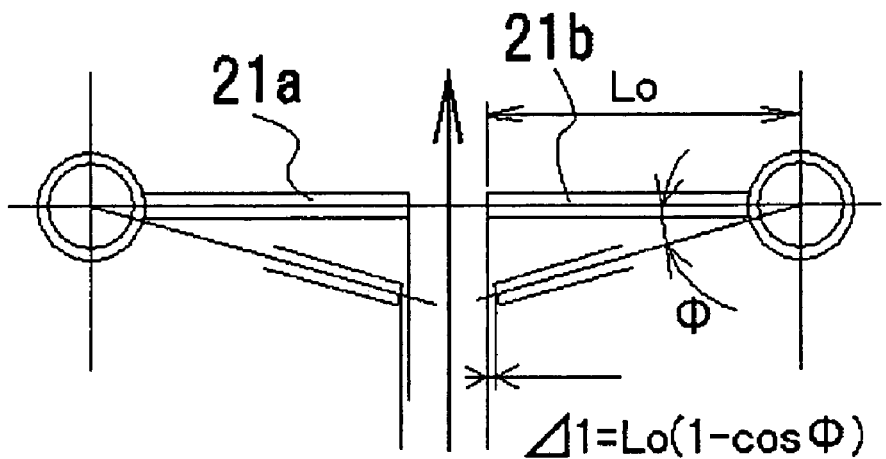

On one hand, in case that the light amount adjusting plates are shifted with an angle Φ by an external involuntary shock when they are at the retreat position of FIG. 11(a), an influence, which is applied to a light amount of the light path R, becomes Δ2, and a large adjustment error of the light amount is invited. However, the light amount adjusting plates are blocked by the restriction stoppers (restriction members) 10a, 10b as to their rotation in one direction, and furthermore, a holding unit is held to a position of the restriction member by an operation of the bias spring 43 in the configuration of FIG. 3, and by an absorbing force of the magnet 86a in the configuration of FIGS. 10(a) and 10(b), and there is no such fear that it moves because of backlash etc.

As described above, the invention is such a thing that a pair of light amount adjusting plates were supported on rotation supporting shafts at opposing peripheral side rim portions of a projection light path so as to swing in a traveling direction of the light path, and therefore, there occurs no such case that the light amount adjusting plates overhang to the side of a projection lens, and it is possible to configure the apparatus so as to be small in size and compact.

In addition, in this case, the light amount adjusting plates are, when they are in a fully opened state, positioned by the restriction members and held at that position, and therefore, there are a few cases in which fluctuation occurs in a light amount to be adjusted, by a dimensional error of this adjusting plate or by backlash which occurs in a drive device and a transmission mechanism which drive so as to open and close this, and accurate light amount adjustment is always possible.

The disclosures of Japanese patent application No. 2004-108719 filed on Apr. 1, 2004, Japanese patent application No. 2004-108720 filed on Apr. 1, 2004, and Japanese patent application No. 2004-262690 filed on Sep. 9, 2004 are incorporated herein by reference.

While the invention has been explained with reference to the specific embodiments of the invention, the explanation is illustrative and the invention is limited only by the appended claims.

What is claimed is:

1. A light amount adjusting apparatus comprising:
a light path for projecting light from a light source,
at least a pair of light amount adjusting plates disposed on a peripheral side rim portion of the light path,
a pair of rotation supporting shafts attached to the pair of light amount adjusting plates, respectively, said rotational supporting shafts being allocated on opposing side rim portions of said light path, so as to be able to swing in a traveling direction of the light path,
a drive unit which drives to open and close said light amount adjusting plates between a narrow-down position such that they enter into the light path and a retreat position such that they retreat to outside of the light path,
a restriction member which restricts rotation of said light amount adjusting plates at said retreat position, and
a holding unit which holds said light amount adjusting plates to the restriction member,
wherein said restriction member is a stopper member which blocks a predetermined angle or further rotation of said light amount adjusting plates, and the holding unit is a biasing member including a spring and a magnet which biases the light amount adjusting plate to this stopper member.

2. The light amount adjusting apparatus as set forth in claim 1, wherein said drive unit includes a drive source and a transmission member which transmits a drive force of this drive source to said light amount adjusting plates, and a biasing unit, which biases said light amount adjusting plates to the restriction member, is disposed on this transmission member.

3. The light amount adjusting apparatus as set forth in claim 2, wherein said transmission member is arranged in a direction which is generally orthogonal to this drive rotation shaft, and couples said drive rotation shaft to each of said pair of rotation supporting shafts, respectively.

4. The light amount adjusting apparatus as set forth in claim 3, wherein said transmission member is disposed so as to be able to carry out a back-and-forth movement in a direction which is generally orthogonal to said pair of rotation supporting shafts, and the rotation supporting shafts are rotated by a given amount, respectively, by the back-and-forth movement of the transmission member due to the drive rotation shaft.

5. The light amount adjusting apparatus as set forth in claim 3, wherein said transmission member includes a rack which can move back and forth in a direction generally orthogonal to said pair of rotation supporting shafts, and pinions having gears meshing with said rack and disposed on said pair of rotation supporting shafts; and said pair of light amount adjusting plates is equipped with restriction members which restrict a rotation at the retreat position where they were retreated from the light path, and a biasing member disposed on the rack, which holds the light amount adjusting plates to this restriction member.

6. The light amount adjusting apparatus as set forth in claim 1, wherein said pair of light amount adjusting plates is disposed at opposing left and right side rim portions and up and down side rim portions of the light path, respectively, and each light amount adjusting plate is supported on the rotation supporting shaft, so as to be able to turn in a traveling direction of the light path, respectively.

7. The light amount adjusting apparatus as set forth in claim 1, wherein said pair of light amount adjusting plates form an opening which is generally uniform toward left and right, and up and down sides from a center of the light path.

8. The light amount adjusting apparatus as set forth in claim 7, wherein said pair of light amount adjusting plates stand face to face with each other, with a space in between, and openings are formed in the facing end portions, respectively.

9. A projector comprising an image forming unit for forming an image, and said light amount adjusting apparatus according to claim 1.

10. The projector as set forth in claim 9, wherein said light amount adjusting plates are supported so as to turn in a traveling direction of the light path on a pair of rotation supporting shafts which are allocated generally parallel to each other, at both side rims of the projection light path; said drive rotation shaft is allocated generally parallel to said rotation supporting shaft; and a transmission member is installed to transmit rotation of the drive rotation shaft to each one of said pair of rotation supporting shafts, respectively, said transmission member being arranged in a direction which is generally orthogonal to the drive rotation shaft.

11. The projector as set forth in claim 9, wherein said pair of light amount adjusting plates forms an opening which is generally uniform toward left and right, and up and down sides from a center of the light path.

12. A light amount adjusting apparatus comprising:
a light path for projecting light from a light source,
at least a pair of light amount adjusting plates which is allocated at a peripheral side rim portion of the light path,
a pair of rotation supporting shafts which supports said light amount adjusting plates swingably in a traveling direction of the light path and which is allocated at opposing side rim portions of the light path,
a drive unit which drives to open and close said light amount adjusting plates between a narrow-down position in which they enter into the light path and a retreat position in which they retreat outside the light path, said drive unit including a motor with a drive rotation shaft, a restriction member which blocks a predetermined angle or further rotation of said light amount adjusting plates at the retreat position, a first transmission lever which carries out a back-and-forth movement of a predetermined amount by rotation of the drive rotation shaft, and a second transmission lever member which transmits a movement of the first transmission member to said light amount adjusting plates, and
a biasing unit disposed between the first transmission lever member and the second transmission lever member, for biasing said light amount adjusting plates to said restriction member at the retreat position.

13. The light amount adjusting apparatus as set forth in claim 12, wherein said motor is a stepping motor, and said light amount adjusting plates are held at the narrow-down position by a magnetic force at a time of non-power distribution thereof.

* * * * *